UNITED STATES PATENT OFFICE.

DAVID E. BREINIG, OF NEW YORK, N. Y.

IMPROVEMENT IN PREPARING LINSEED OR OTHER OILS FOR PAINTING.

Specification forming part of Letters Patent No. 61,653, dated January 29, 1867.

*To all whom it may concern:*

Be it known that I, DAVID E. BREINIG, of the city of Brooklyn, in the county of Kings and State of New York, have invented a new and useful Improvement in Treating Linseed or other Oils or Fats; and I do hereby declare that the following is a full, clear, and exact description thereof, which will enable others skilled in the art to fully understand and make use of the same.

This invention consists in treating linseed or other oils or fats with metalline gum, with or without turpentine, naphtha, or other suitable liquids, for the purpose of improving the properties of linseed or other oils, by reducing the amount of glutin, volatile or fatty matters (olic acid) contained in linseed or other oils, and by increasing the adhesive and drying properties, the metallic salt acting as a preserver from insects either in or out of water, therefore being a great advantage for manufacturers' and painters' purposes.

The metalline gum which I use in treating linseed-oil I prepare as follows: I take fifty-six pounds of a strong alkali, such as caustic soda or potash, dissolve it in forty-eight gallons of water either by dry heat or steam, and to this solution I add twenty-eight gallons either linseed-oil, cotton-seed oil, or any of the drying-oils, or their equivalent in fats. This mixture I boil until the ingredients are united. I then take any suitable metallic salt, such as the nitrate of lead or copper, or the sulphate of zinc, in solution of 24° Baumé, and add a sufficient quantity to the soap, so that the metalline gum will separate from the alkaline solution, said metalline gum being insoluble in water, and being composed of a fatty salt, the base of which is the metallic oxide.

By washing repeatedly in clear water this metalline gum is freed from the alkaline salt, and I then form it into rolls or sticks ready for use.

A similar gum can be made by boiling a metallic salt with oil and a little water; but this compound would be brittle, and not so good for my purpose.

In treating linseed or other oils or fats with this metalline gum, I take two hundred and fifty pounds of gum, place it into a tank or vat provided with a steam-coil, so that the gum can be heated. As soon as the gum is dissolved I add fifty gallons of raw linseed-oil; boil it for two hours. Then I place in another tank, vat, or still one hundred and thirty gallons of spirits of turpentine or naphtha, or part of each, and add the solution of metalline gum in linseed-oil, stir it for half an hour, and then let it stand until it is cold and clear, and then I draw it off and barrel it for the market.

If the liquids are placed in a still, I distill over part of the turpentine or naphtha and then draw it off, and when cool barrel it.

For heavy or double-boiled oil for oil-cloth manufacturers, I take fifty pounds of metalline gum, fifty gallons of linseed-oil, six pounds of binoxide of manganese, twenty pounds of litharge, and twenty-six gallons of spirits of turpentine or naphtha, or part of each. I place the gum in a vat, and melt as before. I place the linseed-oil, manganese, and litharge into another tank and boil it for four hours. I then draw it off, and place it in the tank to the gum, and boil it again for two hours. I then add the spirits of turpentine or naphtha, or part of each, and let it cool, and then barrel it for use.

For printers' ink, I use seventy-five pounds of gum, and prepare in the same manner as the double-boiled oil.

In preparing my varnish, I place the clear oil (either single or double boiled) in a still and distill over all the turpentine and naphtha, and then draw it off into suitable vessels; let it stand uncovered, to absorb the oxygen from the air, for eight days. I then add spirits of turpentine sufficient so it will flow easy under the brush. In some cases I add borate of manganese, to produce a quick-drying varnish.

Instead of linseed-oil other quick-drying oils, such as cotton-seed oil or other fats, may be treated as above stated.

Instead of linseed-oil other oils, such as cotton-seed, fish, or petroleum oils, may be treated by using oxidizing agents to generate drying properties.

I do not confine myself strictly to the herein-mentioned proportion, as it may be varied according to certain purposes.

What I claim as new, and desire to secure by Letters Patent, is—

The within-described process of treating linseed or other oils or fats with metalline gum and spirits of turpentine, naphtha, or other suitable liquid, substantially as and for the purposes set forth.

D. E. BREINIG.

Witnesses:
WM. F. MCNAMARA,
ALEX. F. ROBERTS.